United States Patent
Hecher et al.

(10) Patent No.: US 12,049,544 B2
(45) Date of Patent: *Jul. 30, 2024

(54) METHOD FOR PRODUCING A STABILIZER COMPOSITION, AND STABILIZER COMPOSITION PRODUCED USING SAID METHOD

(71) Applicant: AKDENIZ CHEMSON ADDITIVES AG, Arnoldstein (AT)

(72) Inventors: Michael Hecher, Koblach (AT); Hubert Mödritscher, Arnoldstein (AT); Günther Schmid, Villach (AT)

(73) Assignee: AKDENIZ CHEMSON ADDITIVES AG, Arnoldstein (AT)

( * ) Notice: Subject to any disclaimer, the term of this patent is extended or adjusted under 35 U.S.C. 154(b) by 0 days.

This patent is subject to a terminal disclaimer.

(21) Appl. No.: 18/130,031

(22) Filed: Apr. 3, 2023

(65) Prior Publication Data

US 2023/0235131 A1 Jul. 27, 2023

Related U.S. Application Data

(63) Continuation of application No. 16/466,406, filed as application No. PCT/AT2017/060328 on Dec. 7, 2017, now Pat. No. 11,760,846.

(30) Foreign Application Priority Data

Dec. 12, 2016 (AT) ............... A 51127/2016

(51) Int. Cl.
*C08J 3/22* (2006.01)
*C08K 5/00* (2006.01)
(Continued)

(52) U.S. Cl.
CPC ............... *C08J 3/223* (2013.01); *C08K 5/005* (2013.01); *C08K 9/02* (2013.01); *C08J 2327/06* (2013.01); *C08K 5/098* (2013.01)

(58) Field of Classification Search
CPC ............................. C08K 5/005; C08K 5/098
See application file for complete search history.

(56) References Cited

U.S. PATENT DOCUMENTS

| | | | |
|---|---|---|---|
| 5,185,457 | A | 2/1993 | Carduck et al. |
| 6,143,814 | A | 11/2000 | Schiller et al. |

(Continued)

FOREIGN PATENT DOCUMENTS

| | | |
|---|---|---|
| CN | 1869111 | 11/2006 |
| CN | 103328425 | 9/2013 |

(Continued)

OTHER PUBLICATIONS

ISR issued in International Patent Application No. PCT/AT2017/060328, dated Feb. 27, 2018.

(Continued)

*Primary Examiner* — Michael F Pepitone
(74) *Attorney, Agent, or Firm* — GREENBLUM & BERNSTEIN, P.L.C.

(57) ABSTRACT

A method for producing a stabilizer composition for a polymer and a stabilizer composition produced by the method. At least one carboxylic acid is reacted with at least one metal compound, such as at least one metal hydroxide and/or at least one metal oxide and/or at least one metal carbonate, thereby forming a metal carboxylate of the carboxylic acid. The reaction of the carboxylic acid with the metal compound is carried out in a continuous manner in an extruder while reaction water being formed is discharged out of the extruder.

16 Claims, 1 Drawing Sheet

(51) Int. Cl.
    *C08K 5/098*     (2006.01)
    *C08K 9/02*     (2006.01)

(56) References Cited

U.S. PATENT DOCUMENTS

| | | | |
|---|---|---|---|
| 6,147,147 A | | 11/2000 | Hoover et al. |
| 11,760,846 B2 * | | 9/2023 | Hecher .................. B29B 7/603 524/284 |

FOREIGN PATENT DOCUMENTS

| | | |
|---|---|---|
| CN | 105209535 | 12/2015 |
| DE | 1 937 862 | 2/1971 |
| DE | 38 52 787 | 8/1995 |
| DE | 196 27 258 | 1/1998 |
| DE | 197 55 561 | 6/1999 |
| DE | 10 2004 007 429 | 9/2005 |
| DE | 10 2004 024 891 | 12/2005 |
| EP | 0 304 831 | 3/1989 |
| EP | 0 813 904 | 12/1997 |
| GB | 1074093 | 6/1967 |
| RU | 2 087 460 | 8/1997 |
| SU | 601276 | 4/1978 |
| WO | 02/032845 | 4/2002 |
| WO | 2014/140383 | 9/2014 |

OTHER PUBLICATIONS

Martin, C., "Twin Screw Extruders as Continuous Mixers for Thermal Processing: a Technical and Historical Perspective", AAPS PharmSciTech, 17(1):3-19 (2016).

* cited by examiner

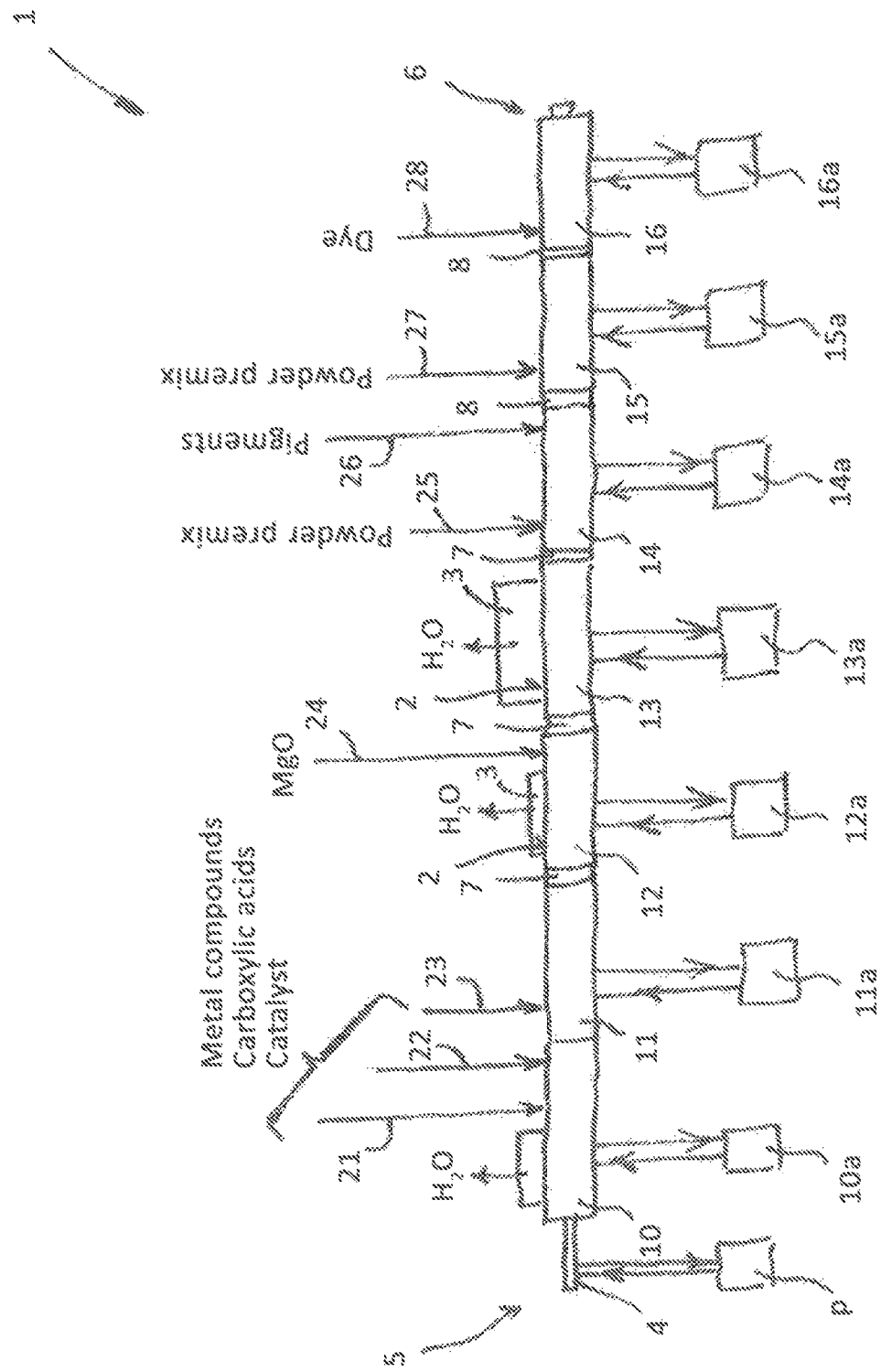

METHOD FOR PRODUCING A STABILIZER COMPOSITION, AND STABILIZER COMPOSITION PRODUCED USING SAID METHOD

This is a Continuation of U.S. application Ser. No. 16/466,406, now issued as U.S. Pat. No. 11,760,846, which is the U.S. National Stage of PCT/AT2017/060328, filed Dec. 7, 2017, which claims priority to Austria Application No. A 51127/2016, filed Dec. 12, 2016. The disclosure of each of these applications is incorporated herein by reference in its entirety.

A 51127/2016, filed Dec. 12, 2016. The disclosure of each of these applications is incorporated herein by reference in its entirety.

The invention relates to a method for producing a stabilizer composition for a polymer, wherein a carboxylic acid is reacted with at least one metal compound, such as at least one metal hydroxide and/or at least one metal oxide and/or at least one metal carbonate, thereby forming a metal carboxylate of the carboxylic acid.

Furthermore, the invention relates to a stabilizer composition for a polymer.

Stabilizers are typically added to polymers in order to enable an efficient processing. Since a polymer is frequently exposed to a plurality of influences and loads during use, multiple components that are added collectively or sequentially during the production of the stabilizer composition are usually required.

In the processing of polymers, stabilizer compositions that can be used in a ready-to-use state (referred to as "one-packs") have proven effective.

Ready-to-use stabilizer compositions often comprise metal carboxylates, that is, reaction products of carboxylic acids, preferably fatty acids, with metal hydroxides and/or metal oxides and/or metal carbonates, for example basic metal carbonates, and other additives such as zeolites, hydrotalcites, chalk, pigments, other co-stabilizers, antioxidants and the like. A concrete tailoring of the composition is thereby arranged with a focus on the intended field(s) of use of the polymer.

For a stabilizer composition in ready-to-use form or a one-pack, it is necessary to mix the individual components. For this purpose, according to the prior art, a reaction of fatty acids with metal hydroxides and/or metal oxides and/or metal carbonates is carried out in a first step to form the desired metallic soaps or metal carboxylates. For example, in addition to the common carboxylic acids such as lauric acid or stearic acid, oxides of the transition metals such as zinc oxide (ZnO) and/or alkali oxides and/or alkaline earth oxides and/or alkali hydroxides and/or alkaline earth hydroxides such as calcium hydroxide [$Ca(OH)_2$] are used as oxides, for example. Carboxylic acid or the metal compound can also be added in excess so that acidic or basic metal carboxylates are formed. After this reaction in a first step, the other components are admixed and incorporated as needed in a batch process in order to ultimately create the stabilizer composition.

In the production of ready-to-use stabilizer compositions with metal carboxylates of carboxylic acids, a process management in the batch process is necessary because the reaction of carboxylic acids with the metal oxides and/or metal hydroxides is to be fully completed. An incomplete or varying reaction conversion ultimately results in an undesired rheology or a batch-dependent anomalous rheology during the polymer processing, which is not desired. However, because this first step of reacting the carboxylic acid and the subsequent admixture of additional components must take place in a batch process, the overall result is a time-intensive process with a limited mass throughput.

This is addressed by the invention. The object of the invention is to specify a method of the type named at the outset with which a high throughput can be achieved without losses in relation to a product quality.

A further object is to specify an improved stabilizer composition.

The method-related object of the invention is attained if, in a method of the type named at the outset, the reaction of the carboxylic acid, in particular a fatty acid, with the metal compound is carried out in a continuous manner in an extruder while reaction water being formed is discharged out of the extruder.

One advantaged obtained with the method according to the invention is that, if reaction water being formed is discharged out of the extruder, the method in this process, and therefore the process as a whole, can be run in a continuous manner. It is thereby possible, with a length of the extruder and/or with a free volume in the extruder, to tailor the reaction time required for an in particular complete reaction such that there is no residual water content or only a specifically predefined, reproducible residual water content in the product. This can be easily set once it is recognized that the extruder according to the invention can be designed with openings, that is, that reaction water being formed has the possibility of escaping.

A continuous process management requires not only less monitoring and therefore a smaller personnel expense than a batch process, but rather it in particular also provides the advantage that a mass of stabilizer composition which can be produced or yielded per unit of time is significantly higher and can be many times higher compared to a batch process, for example. There thus emerges a highly productive process which results in an excellent product, since a thorough intermixing first of the reagents and later of the resulting products takes place in the extruder and additional stabilizer components can subsequently also be added if necessary.

Any desired compounds that react with the at least one carboxylic acid to form a carboxylate can be used as a metal compound. Typically, the reaction takes place with at least one metal hydroxide and/or at least one metal oxide and/or at least one metal carbonate, wherein in particular basic metal carbonates are also suitable.

Aliphatic or aromatic, mono- and/or di- and/or polycarboxylic acids, in particular fatty acids, which are constructed with carbon chains having 2 to 30 carbons that can be linear or branched and which can optionally also be partially substituted with hydroxyl groups and amino groups are to be understood as carboxylic acids.

The cations which react to form the metallic soaps or metal carboxylates are, within the scope of the invention, added as metal hydroxide and/or metal oxide and/or metal carbonates and/or basic metal carbonate, wherein multiple different metal oxides, metal hydroxides, metal carbonates and/or basic metal carbonates can also be added.

The cations can be from the groups of the alkali metals and/or alkaline earth metals, zinc, aluminum, tin, and/or from the group of rare earth metals or the like.

The metal compounds can be added as a mixture of multiple different metal compounds or, preferably, added sequentially.

It is possible that reaction water is actively extracted from the extruder. For this purpose, it can be provided, for example, that at one or more locations of the extruder a negative pressure is applied through which the water is extracted from the extruder. In particular, a vacuum can be applied, for example a water-jet vacuum. However, it is preferred if the reaction water is allowed to escape. Through a passive escape of the reaction water without additional measures, the reaction mixture can be processed or run under atmospheric pressure. Aside from a process management with simple equipment, this also offers the advantage that a foaming, which can occur during the reaction of the carboxylic acids with metal hydroxides and/or metal oxides, is not actively facilitated.

The discharge of the reaction water can in principle take place or be actively facilitated at any desired locations of the extruder. It is preferred that the discharge of the reaction water occurs through openings of the extruder. The openings can be arranged on an outer side of the extruder along the flow of material. Thus, in a preferred variant, this involves what is referred to as an open extruder, out of which the reaction water escapes in a simple manner and without additional measures. Since the reaction mixture can foam up, it is preferred that the openings are provided on the top side. For example, the openings can thereby be embodied in the form of slots, wherein the slots can also be surrounded by laterally rising walls that rise upward from the extruder. In this case, a foaming in the extruder that is not excessively strong can be managed without a problem, since the foam can still collect within the walls without an overflow out of the extruder taking place.

The at least one carboxylic acid is preferably fed into the extruder in liquid form. The carboxylic acid can thereby be fed into the extruder at a temperature of more than 75° C., preferably more than 80° C., in particular more than 80° C. up to 150° C. Higher temperatures render it possible that the reaction can take place as efficiently as possible in the sense of a complete reaction along a short distance of the extruder.

To initiate a reaction of the carboxylic acid with the metal hydroxide and/or the metal oxide and/or the metal carbonate and/or another metal compound, or to allow said reaction to proceed more rapidly, a catalyst is preferably supplied. For this purpose, it is expedient that the catalyst is fed into the extruder with the carboxylic acid or with metal hydroxide and/or metal oxide and/or metal carbonate. If the carboxylic acid is supplied first with a metal hydroxide and possibly or alternatively also with a metal oxide, the two components can already be at least partially mixed with one another. The subsequent downstream metered addition of the catalyst then facilitates a rapid reaction sequence. A catalyst content can thereby be kept relatively low. Preferably, a weight ratio of carboxylic acid to catalyst can be selected in the range from more than 0 to 50, preferably 20 to 45.

Within the scope of the invention, catalysts are to be understood as meaning materials that react with passivated surfaces of metal hydroxide and/or metal oxide and/or metal carbonates and/or basic metal carbonate particles and thus, on the one hand, render the particle surfaces more reactive and, on the other hand, themselves continue to react with the carboxylates through a transfer of the cation. Water, inorganic and organic acids, acid anhydrides, short-chain carboxylic acids, short-chain carboxylates or the like can be used as catalysts. Over the course of the reaction, catalysts can also partially or completely separate out of the process by means of evaporation out of the melt or mixture.

It is beneficial if the reaction of the carboxylic acid with the metal compound such as a metal hydroxide and/or a metal oxide and/or a metal carbonate is carried out in multiple cascaded modules of the extruder. The presence of multiple modules offers several advantages: On the one hand, the individual modules can possibly be temperature-controlled in an at least partially separate manner, which enables a desired temperature setting along the modules and thus a targeted influencing of the reaction. On the other hand, elements for the improved dispersion of the reaction mixture, in particular dispersion rings or the like, can also be provided between the individual modules, which facilitates a further thorough intermixing. In this context, it can also be provided that additional metal compounds are admixed downstream. A sequential admixture of, in particular, metal hydroxides and/or metal oxides or additional carboxylic acids may be required in order to be able to control the viscosity of the reaction mixture in a targeted manner. However, if a reaction has already taken place at least partially, additional metal compounds can be admixed as mentioned. Furthermore, differently sized openings or slots can also be provided in individual modules, which enables an optimal tailoring of the withdrawal or escape of reaction water in relation to the respective position of the reaction mixture, and therefore a reaction conversion that will have occurred up to that point. On the whole, optimal conditions can thus be found for the desired reaction of the at least one carboxylic acid with the at least one metal compound.

As mentioned, it can be provided that the modules are temperature-controlled in an at least partially separate manner. A temperature of the modules can thereby be set in particular such that the carboxylic acid is kept in a liquid state. A temperature of the modules is set to at least 50° C., advantageously at least 120° C., preferably at least 140° C., in particular 155° C. to 250° C. In this manner, it is possible to configure the settings even with longer-chained carboxylic acids, if necessary, so that the acids remain in a liquid state during the reaction. At the same time, this results in the possibility of using the temperature to influence the reaction speed and therefore the dwell time in the extruder.

Within the scope of the invention, it can be provided that the reaction of the carboxylic acid with the at least one metal compound is carried out in multiple cascaded modules of the extruder and/or that additional materials are incorporated into the stabilizer composition in multiple additional modules.

Additional materials can be (co-)stabilizers, lubricants, fillers, antioxidants, UV absorbers, pigments, flow aids, impact resistance modifiers, and other acrylate derivatives and/or polymers, such as those known from the prior art or the technical literature.

(Co-)stabilizers are to be understood as meaning, for example, organic stabilizers such as urea and the derivatives thereof, aminocrotonates and the derivatives thereof, uracils and the derivatives thereof, thioesters, glycidyl compounds, amines, amides, amino acids and the derivatives thereof, epoxy compounds, beta-diketones, di- and polyhydropyridines, polyols, isocyanurates, polyalkylpiperidines, layered lattice compounds (LDHs), alkali aluminosilicates or alkaline earth aluminosilicates, alkali aluminum carbonates and the like. Lubricants are to be understood as meaning, for example, hydrocarbon waxes (PE waxes, PP waxes, paraffins, FT paraffins and the like), ester waxes and complex esters, ketones and/or alcohols and/or amines of the fatty acids, chlorinated paraffins, silicones, polysiloxanes, comb copolymers, polyesters, polyamines and the like. Fillers are to be understood as meaning, for example, carbonates, calcites, dolomites, talc, kaolins, aluminum salt compounds and the like.

If the reaction of the carboxylic acid with the metal hydroxide and/or the metal oxide is complete and no reaction water content or only a predefined reaction water content is present, additional components for the composition of the stabilizer can be incorporated. For this purpose, multiple additional modules are preferably provided. These additional modules can also be temperature-controlled at least partially separately from one another. In this manner, it is possible to incorporate additional defined liquid or preferably solid components at controlled temperatures. With the method, temperature-sensitive components can thus also be incorporated over the further course of the process in a module positioned farther to the rear in a downstream perspective.

It would be possible for individual components to react with one another in (mostly) undesired cross-reactions. Here, the method then offers advantages with the possibility of the region-by-region setting of the temperature, since corresponding reactions can be suppressed by low temperatures.

For an efficient process management, it is advantageous if one or more conveying means in the multiple modules and/or in the additional modules are driven by a single motor. Within the scope of the invention, any desired extruders can be used in principle, as long as openings or the like are provided via which reaction water can escape in a first extruder segment. The conveying means can be a screw, for example, if a screw extruder is provided. The individual modules are then arranged around the single screw that is driven by a single motor. However, it is particularly preferred that a planetary roller extruder is used. A planetary roller extruder offers the advantage that the material which is to be processed or reacted to completion is not only mixed particularly thoroughly, but is also divided into very thin layers and intermixed in this form. This offers advantages for a high quality of the produced stabilizer composition, since the initially produced metal carboxylate and the subsequently incorporated additives or additional components can be mixed with one another particularly finely, which results in a homogeneous fine distribution of the incorporated components. This is not possible in this quality in batch processes.

For the desired high homogeneity of the stabilizer, which is removed as a strand, for example, large local temperature differences in the extruder can prove disadvantageous. If a planetary roller extruder is used it can be provided that a spindle of the planetary roller extruder is at least partially or completely temperature-controlled in the interior. Particularly if the modules are also temperature-controlled, a large temperature gradient from an outer side of the modules towards the extruder axis can thus be avoided.

In addition to the removal of the produced stabilizer composition as a strand at the end of the extruder, it is also possible to perform a granulation of the material exiting the extruder or of the stabilizer composition. Such a granulation can take place using methods known per se from the prior art, as is described in DE 1 937 862 A, for example.

A formation of stabilizer melts under water, possibly with a cutting to length, for example melt strands exiting through a hole-type nozzle which are subsequently cut to a predefined length, is preferred over a cooling on cooling conveyors that can in principle also be used.

One advantage with a cooling of a stabilizer melt under water is that there is significant freedom with regard to the melt viscosity. The viscosity of the melt can be suitably set for the subsequent formation under water via a temperature control. This allows a compact design or a small space requirement on the one hand and on the other hand also yields high throughput. Furthermore, compared to cooling conveyors, the investment costs are relatively low, since the melt strands can be extruded via a perforated disc.

A specific design of the extruder is not of critical importance. The design can be a planetary roller extruder, but also any other type of extruder that is provided on the end side with a perforated plate, for example, a screw extruder with one or two screws. A viscosity of the melt is thereby set such that there is a sufficient pressure buildup before the perforated plate to subsequently enable a clean cut, wherein the melt is still suitably conveyable, however. When the melt is pressed through the perforated disc, individual melt strands are then formed which are cut to length by one or more rotating blades. The resulting granulate is subsequently further transported in the water current and ultimately dried.

The stabilizer composition as described above is preferably what is referred to as a one-pack stabilizer composition; that is, it does not require additional additives or aggregates in order to immediately be used as a stabilizer, in particular for halogen-containing polymers such as PVC.

According to the advantages illustrated above, a stabilizer composition produced using a method according to the invention differs from stabilizer compositions produced in the batch method by a higher homogeneity and uniformity. Accordingly, the other object is attained by a stabilizer composition produced according to the invention.

BRIEF DESCRIPTION OF DRAWINGS

FIG. 1 shows a planetary roller extruder.

DETAILED DESCRIPTION

Additional features, advantages and effects follow from the exemplary embodiment described below. In the drawing which is thereby referenced, FIG. 1 shows a planetary roller extruder.

In FIG. 1, an extruder 1 is illustrated which is embodied as a planetary roller extruder. The planetary roller extruder comprises multiple modules 11, 12, 13, 14, 15, 16. The modules 11, 12, 13, 14, 15, 16 are arranged one after another and allow a continuous flow of material in the extruder 1. Each of the modules 11, 12, 13, 14, 15, 16 is connected to a heating/cooling circuit 11a, 12a, 13a, 14a, 15a, 16a. The corresponding circuits are circuits which can be operated with oil or water or another medium. An operation with oil permits a maximum temperature of up to 300° C. and is provided for the modules 11, 12, 13, 14, 15. An operation with water permits a maximum temperature of 220° C. For the module 16, the circuit is operated with water. Although not illustrated, it can also be provided that some of the modules 11, 12, 13, 14, 15, 16 can respectively be operated collectively through one circuit. This is advantageous, for example, for the modules 13, 14 which can be run at approximately the same temperature.

In addition, as illustrated in FIG. 1, a filling section 10 can be provided into which at least one carboxylic acid, in particular a fatty acid, and at least one metal hydroxide and/or at least one metal oxide and/or at least one metal carbonate and/or at least one basic metal carbonate can be fed and mixed. In principle, however, these components can also be immediately introduced in a metered manner into the first module 11. A dedicated heating/cooling circuit 10a is provided for the filling section 10.

A central spindle 4 that is driven by a motor 3 passes through the extruder 1. The spindle 4 runs through the filling section 10 and all modules 11, 12, 13, 14, 15, 16 of the extruder. Because the extruder is a planetary roller extruder, the spindle 4 is surrounded by planetary spindles which intermesh with an inner side of each of the modules 11, 12, 13, 14, 15, 16. During operation, it can be ensured by means of a corresponding oblique intermeshing that the material is propelled downstream after being introduced into the extruder 1, so that the material can ultimately exit at a rear end 6 of the extruder 1 opposite from a front end 5 of the extruder 1.

Downstream, at the modules 11, 12, 13, dispersion discs 7 or other means of distributing mass into a subsequent unit can be provided. A degassing ring 8 can be subsequently arranged downstream at the additional modules 14, 15. The spindle 4 can also be internally temperature-controlled, for which purpose a dedicated circuit 9 is provided which can be operated, for example, with oil up to a temperature of 300° C. In this manner, strong temperature gradients between an outer side of the extruder 1, or expressed more accurately the inner side of the modules 11, 12, 13, 14, 15, 16, and the spindle 4 can be avoided. In other words:

To a great extent, temperature inhomogeneities in the extruder 1 can be avoided.

For the supply of material to produce a stabilizer composition, suitable feeds 21, 22, 23, 24, 25, 26, 27, 28 are provided. Furthermore, openings 2 are provided laterally, in particular on the top side as illustrated or in an upper vertical region, on the extruder 1. The openings 2 can be embodied in the form of slots and are laterally surrounded by rising walls 3. Through these slots or openings 2, reaction water forming during a reaction of the previously dispensed carboxylic acids with the metal compounds can escape. It is also possible that this escape of reaction water is actively facilitated, for example by extraction by means of a pump. In principle, however, a corresponding process management can be omitted if the modules 11, 12, 13 are suitably designed. To prevent a foaming, it is also expedient if the reaction water escapes independently or without supporting measures.

A reaction of the at least one carboxylic acid with the at least one metal hydroxide and/or the at least one metal oxide occurs in the modules 11, 12, 13, which constitute a sort of vessel cascade. At the end of the module 13, the reaction water formed will have either completely escaped or at least have been reduced to a desired content. At the end of the module 13, a temperature of the, in this case still liquid, mass can be approximately 200° C. to 250° C. This module 13 can exclusively be provided for the escape of reaction water. The walls 3 can in this case be designed to be higher than those on the module 12. This mass then passes into the module 14 through a final dispersion ring 7. In this module 14, the processed material is still liquid or is present as a melt. Liquid components, premixed powders and/or pigments can then be introduced via the feed 26. Here, a temperature can be approximately 40° C. to 200° C. In the subsequent module 15, additional components, for example zeolites, chalk or co-stabilizers, can once again be admixed via a feed 27. Since the temperature in this region is already significantly lower, the processed mass or the material propelled in the extruder 1 already exhibits a paste-like, much more highly viscous consistency at this position. Finally, in the module 16, which is heated with water, an admixture of thermally sensitive materials occurs via another feed line 28, for example, selected raw materials and/or dyes, at relatively moderate temperatures of 30° C. to 130° C. Like the other feed lines 21, 22, 23, 24, 25, 26, 27, the feed line 28 is equipped with suitable metering means, for example, a scale or a metering pump.

It can be provided that several of the modules 11, 12, 13, 14, 15, 16 can also be combined into a single module. For example, the modules 11, 12, 13 can be combined into one or two modules. The same applies to the modules 14, 15, 16. The number of modules 11, 12, 13, 14, 15, 16 is at least two, in particular three or more, but has no upper limit.

Finally, the stabilizer composition produced in such a manner exits the extruder 1 at the end thereof arranged downstream. The strand-shaped material of the stabilizer composition can thereby be removed as such or as a strand. It is also possible that a granulation of the material produced in such a manner is arranged downstream. The temperature in the module 16 is also based thereon. For a removal as a strand, lower temperatures in the range of 30° C. to 80° C. are normally sufficient. If granulation is to take place or tablets are to be produced, the temperature is higher, in the range of approximately 110° C. to 140° C.

Optionally, safety devices such as screens or magnetic separators can also be affixed to the end of the extruder 1 in order to trap any contamination in the finished stabilizer composition. However, these devices can also be installed at some or all of the feeds 21, 22, 23, 24, 25, 26, 27, 28.

In Tables 1 and 2 below, typical parameters for producing a stabilizer composition with an extruder 1 of the type described above are illustrated.

TABLE 1

Composition for stabilizer composition

| Component | Composition [%] |
|---|---|
| Stearic acid, liquid (100° C.) | 27.8 |
| Calcium hydroxide Ca(OH)$_2$ | 3.9 |
| Zinc oxide ZnO | 1.3 |
| Catalyst (H$_2$O) | 1.7 |
| Paraffin wax (drop point 55° C. to 77° C.) | 5.5 |
| Dilauryl thiodipropionate | 4.6 |
| Antioxidant (Irganox 1076) | 4.9 |
| Alcamizer P93 (Kisuma) | 50.3 |
| Total | 100 |

TABLE 2

Temperature setting

| System component | Temperature [° C.] |
|---|---|
| Spindle 4 | 160 |
| Filling section 10 | passive* |
| Module 11 | 180 |
| Module 12 | 160 |
| Module 13 | 160 |
| Module 14 | 120 |
| Module 15 | 60 |
| Module 16 | passive* |

*passive means that the corresponding heating/cooling circuit is not active

Not only can a stabilizer composition produced according to Table 1 and 2 be produced in large quantities in little time as strand material or granulate to be cut to length; due to the tailored process conditions and the extrusion via a planetary roller extruder, it also exhibits a high homogeneity and quality with a predefined and reproducible water content.

The invention claimed is:

1. A method for producing a stabilizer composition for a polymer, the method comprising:
    reacting in an extruder at least one carboxylic acid with at
        least one metal compound in a continuous manner, thereby forming a metal carboxylate of the carboxylic acid and reaction water in a continuous manner, and discharging the reaction water being formed out of the extruder through openings arranged on an outer side of the extruder along the flow of material prior to where the stabilizer composition exits the extruder.

2. The method according to claim 1, wherein the carboxylic acid is fed into the extruder in liquid form.

3. The method according to claim 2, wherein the carboxylic acid is fed into the extruder at a temperature of more than 75° C.

4. The method according to claim 1, wherein a catalyst is supplied for reacting the carboxylic with the metal compound.

5. The method according to claim 4, wherein a weight ratio of carboxylic acid to catalyst is selected in the range from more than 0 to 50.

6. The method according to claim 1, wherein the reaction of the carboxylic acid with the metal compound is carried out in multiple cascaded modules of the extruder.

7. The method according to claim 6, wherein the modules are temperature-controlled in an at least partially separate manner.

8. The method according to claim 6, wherein a temperature of the modules is set such that the carboxylic acid is kept in a liquid state.

9. The method according to claim 6, wherein a temperature of the modules is set to at least 50° C.

10. The method according to claim 1, wherein the reaction of the carboxylic acid with the metal compound is carried out in multiple cascaded modules of the extruder and/or in that additional materials are incorporated into the stabilizer composition in one or more additional modules.

11. The method according to claim 10, wherein the additional modules are temperature-controlled at least partially separately from one another.

12. The method according to claim 7, wherein one or more conveying means in the modules are driven via a single motor.

13. The method according to claim 1, wherein a planetary roller extruder is used.

14. The method according to claim 13, wherein a central spindle of the planetary roller extruder is internally temperature controlled.

15. The method according to claim 1, wherein the stabilizer composition is removed from the extruder as a strand.

16. The method according to claim 1, wherein the stabilizer composition is granulated.

* * * * *